United States Patent
Damsgaard

(10) Patent No.: US 12,535,570 B2
(45) Date of Patent: Jan. 27, 2026

(54) LOCATION-BASED AUDIO CONFIGURATION SYSTEMS AND METHODS

(71) Applicant: Bang & Olufsen A/S, Struer (DK)

(72) Inventor: Morten Damsgaard, Copenhagen (DK)

(73) Assignee: Bang & Olufsen A/S, Struer (DK)

( * ) Notice: Subject to any disclaimer, the term of this patent is extended or adjusted under 35 U.S.C. 154(b) by 501 days.

(21) Appl. No.: 17/937,221

(22) Filed: Sep. 30, 2022

(65) Prior Publication Data

US 2024/0111041 A1  Apr. 4, 2024

(51) Int. Cl.
| | |
|---|---|
| *G01S 13/06* | (2006.01) |
| *A61B 5/02* | (2006.01) |
| *G01S 7/41* | (2006.01) |
| *G01S 13/86* | (2006.01) |
| *G01S 15/46* | (2006.01) |
| *H04R 1/32* | (2006.01) |
| *H04R 3/00* | (2006.01) |

(52) U.S. Cl.
CPC .............. *G01S 13/06* (2013.01); *G01S 7/41* (2013.01); *G01S 13/862* (2013.01); *G01S 15/46* (2013.01); *H04R 1/323* (2013.01); *H04R 3/00* (2013.01); *A61B 5/02* (2013.01); *G01S 2015/465* (2013.01)

(58) Field of Classification Search
CPC .......... G01S 13/06; G01S 7/41; G01S 13/862; G01S 15/46; H04R 1/323; H04R 3/00; A61B 5/02
See application file for complete search history.

(56) References Cited

U.S. PATENT DOCUMENTS

| | | | |
|---|---|---|---|
| 7,492,913 B2 | 2/2009 | Connor et al. | |
| 7,760,891 B2 | 7/2010 | Biegelsen | |
| 8,279,709 B2* | 10/2012 | Choisel | H04S 7/301 |
| | | | 367/129 |
| 9,055,337 B2 | 6/2015 | Elliott et al. | |
| 9,349,282 B2 | 5/2016 | Luna et al. | |
| 9,485,556 B1 | 11/2016 | List | |
| 9,510,089 B2 | 11/2016 | Norris et al. | |
| 9,699,579 B2 | 7/2017 | Carlsson et al. | |
| 9,877,135 B2* | 1/2018 | Backman | H04S 7/301 |

(Continued)

FOREIGN PATENT DOCUMENTS

| | | | | |
|---|---|---|---|---|
| CN | 118675302 A | * | 9/2024 | G01S 5/013 |

OTHER PUBLICATIONS

Extended European Search Report dated Feb. 13, 2024 for Application No. 23200539.7, 6 pages.

(Continued)

*Primary Examiner* — Vladimir Magloire
*Assistant Examiner* — Kimberly Jenkins
(74) *Attorney, Agent, or Firm* — Patterson + Sheridan, LLP

(57) ABSTRACT

In general, a user-location device is configured to receive, from an audio-output device, an ultra-wideband (UWB) signal; determine, based on the UWB signal, a first relative location of the audio-output device; determine, based on a detected millimeter-wave (MMW) signal, a second relative location of one or more persons; determine, based on the first relative location and the second relative location, a relative orientation between the audio-output device and the one or more persons; and transmit, to the audio-output device, an indication of the relative orientation.

20 Claims, 5 Drawing Sheets

(56) References Cited

U.S. PATENT DOCUMENTS

| | | |
|---|---|---|
| 10,209,342 B2 * | 2/2019 | Miller .................... G01S 17/86 |
| 12,262,194 B2 * | 3/2025 | Tachi ..................... H04S 7/301 |
| 2004/0208324 A1 | 10/2004 | Cheung et al. |
| 2008/0304677 A1 | 12/2008 | Abolfathi et al. |
| 2012/0022348 A1 * | 1/2012 | Droitcour ............ A61B 5/0816 |
| | | 600/407 |
| 2013/0121515 A1 | 5/2013 | Hooley et al. |
| 2015/0382129 A1 | 12/2015 | Florencio et al. |
| 2020/0084537 A1 | 3/2020 | Milne et al. |
| 2020/0191943 A1 | 6/2020 | Wu et al. |
| 2020/0301378 A1 | 9/2020 | McQueen et al. |
| 2021/0314699 A1 * | 10/2021 | Stahl ................... G10L 21/0208 |
| 2022/0014868 A1 | 1/2022 | Binn et al. |
| 2022/0132052 A1 * | 4/2022 | Mojaver ............ A61B 5/02433 |
| 2023/0341518 A1 * | 10/2023 | Rajab .................... A61B 5/1118 |
| 2024/0069191 A1 * | 2/2024 | Deixler ................ G01S 15/876 |

OTHER PUBLICATIONS

European Office Action dated Nov. 28, 2025 for Application No. 23200539.7, 4 pages.

\* cited by examiner

LOCATION-BASED AUDIO CONFIGURATION SYSTEMS AND METHODS

TECHNICAL FIELD

The present disclosure generally relates to sensor technologies (e.g., radar), and acoustics. In particular, the present disclosure relates to systems and methods for configuring audio parameters based on detected location(s) of one or more user(s).

BACKGROUND

A wide variety of audio-output devices have been designed for playing audible content, such as music, phone calls, informational presentations, or the like, to one or more listeners. For instance, typical speakers (e.g., loudspeakers) are configured to broadcast an audible signal to any potential listener within range of the speaker, i.e., within a threshold distance prior to attenuation of the signal. More recently, audio-devices have been developed that can "beam" an audio signal toward a highly localized region, such that the audio signal is optimally immersive for any listeners located within that region.

SUMMARY

In general, the present disclosure details example devices, systems, and techniques for configuring audio parameters of one or more audio-output devices (e.g., general-broadcast speakers and/or directional speakers), based on the location of the devices relative to one or more users within the same local environment. In particular, devices are disclosed that use millimeter-wave (mmWave) radar technology to precisely locate at least one person within the vicinity of one or more speakers, and then configure certain aspects of the speakers' audio outputs based on the position and/or orientation of the person relative to the speakers.

As one non-limiting example, a user-location device can detect and track a person's location in real-time, and cause a directional speaker to beam an audio signal directly toward the person as the person moves around the room. For instance, the user-location device can transmit an indication of the person's location to the directional speaker, and the directional speaker can use the location data to redirect the beamed audio signal. Alternatively, the user-location device can remotely control the direction of the beamed audio signal based on the determined location data.

As another example, applicable to both general-broadcast speakers and directional speakers, the location device can determine the respective distances between a person and each of two or more speakers (or speaker drivers), and then configure respective audio delays for one or more of the speakers such that the audio streams are precisely synchronized or otherwise enhanced at the person's specific location within the room.

As a third example, applicable to both general-broadcast speakers and directional speakers, the user-location device can detect the presence of a person in the vicinity of the speaker(s), so as to automatically activate the speaker(s) when a person enters the room, and automatically deactivate the speakers when the person leaves the room, so as to provide a seamless audible experience for the user as they move about a dwelling, while also conserving energy from any rooms presently lacking a human listener. Alternatively, the speakers themselves may be configured to activate and deactivate the audible signal, as appropriate, based on location data received from the user-location device.

As another example, the user-location device can determine and track the precise locations of two or more individual people, and then directly or indirectly cause directional speaker(s) to beam a distinct audible signal toward each person.

The above summary is not intended to describe each illustrated example or every implementation of the subject matter hereof. The figures and the detailed description that follow more particularly exemplify various aspects in accordance with this disclosure.

BRIEF DESCRIPTION OF THE DRAWINGS

Subject matter hereof may be more thoroughly understood in consideration of the following detailed description of various examples in connection with the accompanying figures, in which.

Figure 1:
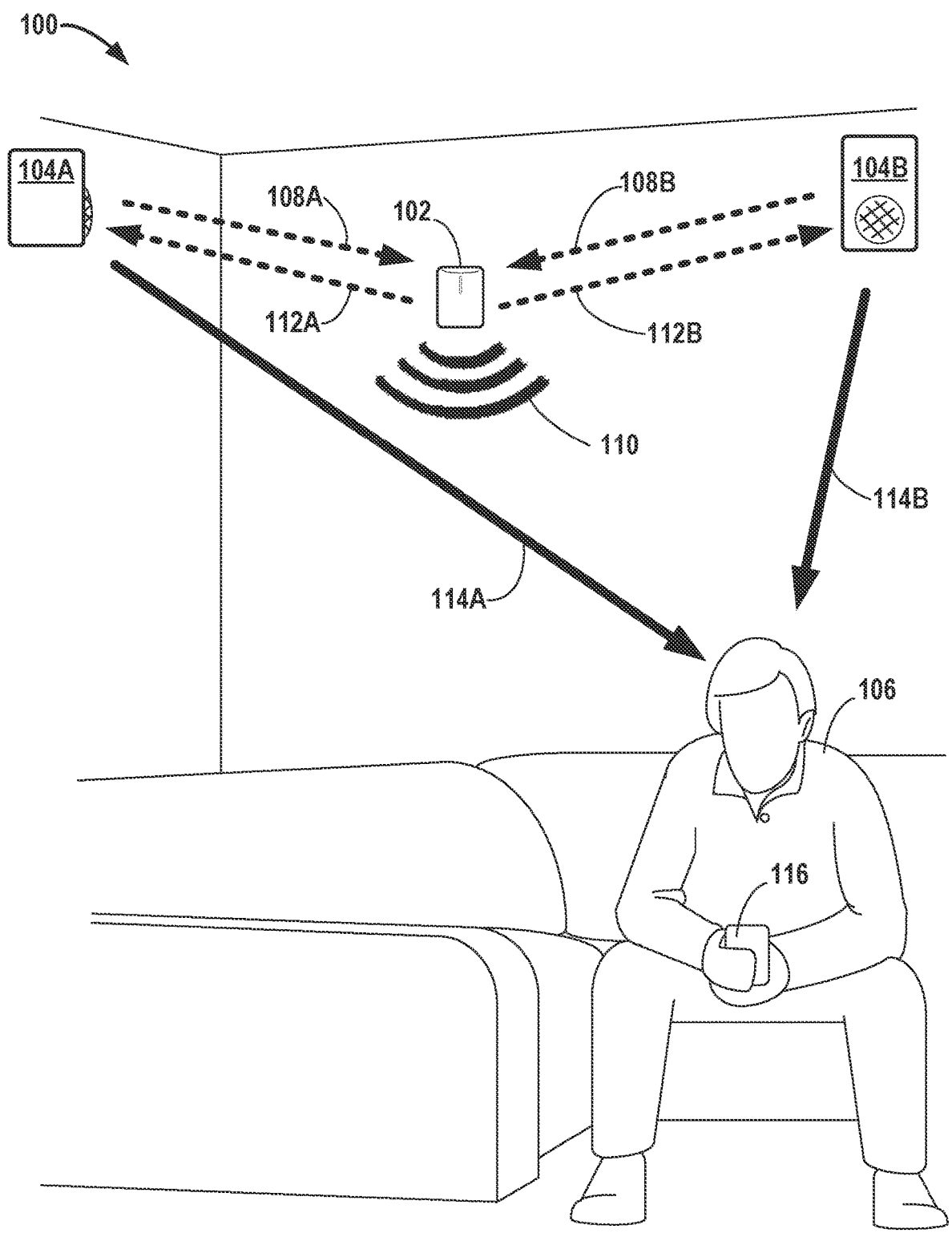
FIG. 1 is a conceptual diagram of a system for configuring audio parameters based on a current location of a user.

While various examples are amenable to various modifications and alternative forms, specifics thereof have been shown by way of example in the drawings and will be described in detail. It should be understood, however, that the intention is not to limit the claimed inventions to the particular examples described. On the contrary, the intention is to cover all modifications, equivalents, and alternatives falling within the spirit and scope of the subject matter of the present disclosure.

DETAILED DESCRIPTION

The present disclosure is directed to the configuration of audio parameters for one or more audio-output devices (e.g., broadcast speakers and/or directional speakers), based on a current location of a user (e.g., a person) within the same local environment. In particular, devices are disclosed that are configured to use Extremely High-Frequency (EHF) (also referred-to herein as "Millimeter-Wave" or "mmWave") radar technology to precisely locate at least one person within the vicinity of one or more connected speakers, and then control the speaker(s)' audio outputs based on the position and/or orientation of the person relative to the speakers.

For instance, FIG. 1 is a conceptual diagram of a system 100 for configuring audio-device parameters based on a determined current location of a user. In general, system 100 includes a user-location device 102, and one or more audio-output devices 104A, 104B (herein also referred-to collectively as "audio-output devices 104," or interchangeably as "audio-output device 104").

In the example shown in FIG. 1, audio-output devices 104 are illustrated as two wall-mounted speakers 104A, 104B, however, this example is not intended to be limiting. Audio-output device(s) 104 can include any suitable number, arrangement, and type of audio devices, such as (but not limited to): wall-mounted general-broadcast loudspeakers, fixed-location directional audio-beam speakers, mobile 360°-broadcast speakers (e.g., wireless Bluetooth speakers), and/or mobile computing devices having an integrated speaker (e.g., smartphones, laptops, tablets, etc.).

As referenced above, user-location device 102 is configured to both (1) determine a location of a person 106 relative to audio-output device(s) 104, and (2) configure one or more audio parameters for audio-output device(s) 104 based on the determined relative location. More specifically, user-location device 102 is configured to determine a "first" location of an audio device 104 (e.g., relative to user-location device 102 itself), determine a "second" location of a person 106 (e.g., relative to user-location device 102 itself), and then determine the location of the person 106 relative to the audio device 104 (i.e., the "difference" between the first relative location and the second relative location).

There are a number of different ways that user-location device 102 can determine the location of an audio-output device 104 relative to itself. Typical modern audio-output devices 104 include an integrated radio-technology tag, and more specifically, a low-energy, ultra-wideband (UWB) tag. Accordingly, in exemplary embodiments described herein, user-location device 102 includes an integrated UWB anchor sensor 210 (see FIG. 2) configured to wirelessly detect the UWB signals 108A, 108B (collectively, "UWB signals 108") broadcast by nearby audio-output devices 104. User-location device 102 can then determine the first relative location of an audio-output device 104 based on the detected UWB signal 108.

Additionally or alternatively, user-location device 102 can be configured to locate an audio-output device 104 by causing the audio-output device 104 to emit a sound outside the audible-frequency range for humans, such as a hypersonic signal. In such cases, user-location device 102 includes an integrated microphone array configured to "hear" the hypersonic signal. User-location device 102 can then perform standard ranging and positioning techniques (e.g., Time-of-Flight (ToF), Angle of Arrival (AoA), etc.) to locate the relevant audio-output device 104. Additionally or alternatively, user-location device 102 and audio-output device 104 may be in wired and/or wireless data communication with one another, either directly or via a local data network, such that the two devices may exchange sufficient metadata for user-location device 102 to locate audio-output device 104.

Figure 2:
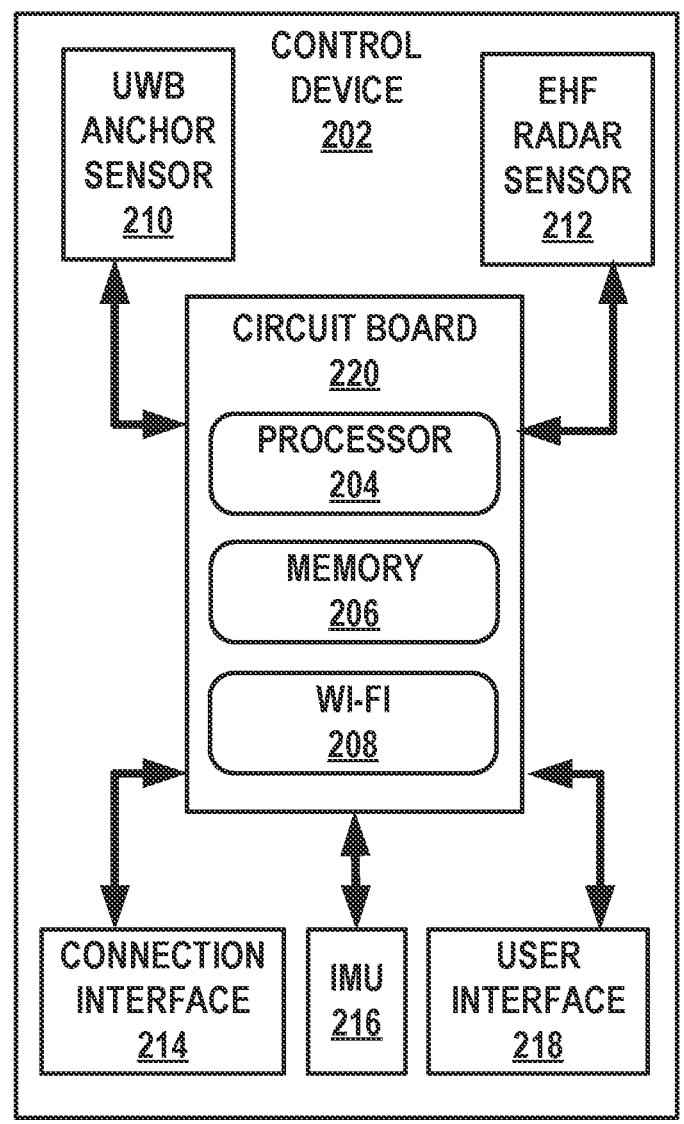
FIG. 2 is a block diagram showing example components of a user-location device for configuring audio parameters based on a current location of a user.

In accordance with techniques of this disclosure, user-location device 102 is further configured to detect and precisely locate a human user 106 (also referred to herein as "person 106") in the vicinity of audio-output devices 104, e.g., in a common local environment with, or within a threshold effective distance from, audio-output devices 104. In exemplary embodiments, user-location device 102 includes an integrated Extremely-High-Frequency (EHF) radar unit 212 (FIG. 2). The EHF band of the electromagnetic (EM) spectrum, from about 30 gigahertz (GHz) to about 300 GHz, corresponds to signal wavelengths of about 1 millimeter (mm) to about 10 mm. Accordingly, user-location device 102 is configured to emit a millimeter-wave (mmWave) signal 110 and detect the reflected signal. Using the standard ranging techniques referenced above (e.g., ToF, AoA, etc.), user-location device 102 can use mmWave signal 110 to essentially "map" at least the portion of the local environment that is "visible" to signal 110.

As detailed further below with respect to FIGS. 4A-4C, user-location device 102 can be configured to detect, locate, and even live-track one or more individual people indicated by the mmWave signals 110. For instance, recent breakthroughs in mmWave technology have shown that certain "human" characteristics, such as patterns associated with a person's heartbeat, respiration, or other biological markers, can be extracted from a detected mmWave signal. Accordingly, user-location device 102 can use mmWave signals 110 to generate 3-D location data for each person 106 within range.

Upon locating one or more audio-output devices 104, and one or more persons 106, user-location device 102 can then compute relative positions and orientations between each respective speaker-person pair. Based on the number, type, and locations of audio-output device(s) 104, as well as the number, locations, and in some cases, identities of persons 106, user-location device is configured to select and apply one or more audio parameters to audio-output devices 104 so as to customize and improve the listening experience for the users. As detailed in the following illustrative examples, audio parameters can include any or all of: (1) a direction of propagation of a beamed audio signal; (2) an audio delay for an audio signal from a particular device; (3) an activation/deactivation of an emitted audio signal; (4) an audio-compensation level; (5) an equalization; or any other similar parameter associated with an audible signal emitted by one of audio-output devices 104.

In the example shown in FIG. 1, after determining the relative location of person 106 via mmWave signal 110, user-location device 102 transmits an indication of the person's location to speakers 104 (as indicated by dashed-line arrows 112A, 112B). In some examples, user-location device 102 communicates this data directly to speakers 104, e.g., via Bluetooth, or another short-range wireless-communication protocol. In other examples, user-location device 102 and speakers 104 may all be connected to a common Wi-Fi network, and user-location device 102 wirelessly transmits the location data 112 via Wi-Fi.

As a first illustrative example implementation of these techniques, as conceptually illustrated in FIG. 1, the transmitted location data 112 directly or indirectly causes speakers 104A, 104B to orient their respective directional-audio circuitry in order to beam audible signals 114A, 114B directly toward user 106. That is, speakers 104 may be configured to receive the location data 112, and based on the location data 112, redirect their audio beams toward user 106. Alternatively, user-location device 102 may remotely control speakers 104 such that user-location device 102 can directly orient the audio beam 114 toward user 106.

As explained further below, even if user 106 were to stand up and move around the room, user-location device 102 can continue to track the person's location in real-time, and cause directional speakers 104 to beam audible signal 114 directly toward user 106. In similar scenarios including multiple users 106, user-location device 102 can determine and track the precise locations of each of two or more individual people, and then directly or indirectly cause directional speaker(s) 104 to beam a distinct audible signal 114 toward each person.

As a second illustrative example implementation also conceptually illustrated in FIG. 1, user 106 is shown to be sitting closer to speaker 104B than to 104A, as indicated by the relative lengths of arrows 114A, 114B. If emitted at the same time, audible signal 114A would take longer to reach, and be heard by, user 106 than audible signal 114B. In such cases, user-location device 102 can be configured to precisely calculate and apply an audio delay for signal 114B to account for the shorter ToF to reach user 106. This way, the two audio streams 114A, 114B will be highly synchronized at the user's position, thereby significantly improving the audio quality and the listening experience. In some examples, a single speaker unit (e.g., speaker 104A) can include two or more integrated speaker drivers (e.g., output discs). Accordingly, through a similar mechanism, user-location device 102 can, based on the location data, directly or indirectly cause speaker 104A to adjust certain audio parameters, including an audio delay, for one or more of the individual speaker drivers, thereby providing for a more immersive audio experience for user 106.

As a third example implementation, applicable to both general-broadcast speakers and directional speakers, since user-location device 102 can detect the presence of user 106 in the vicinity of speaker(s) 104, user-location device 102 can automatically activate speaker(s) 104 when user 106 enters the room, and automatically deactivate speakers 104 when user 106 leaves the room, so as to provide a seamless audible experience for user 106 as they move about a dwelling, while also conserving energy in other rooms presently lacking an intended listener. In a more immersive example of this implementation, user-location device 102 is configured to determine when user 106 is within both an effective range (e.g., a predetermined threshold distance away) of a speaker 104, and also within a predetermined effective field-of-view (FoV) of the speaker 104. In such examples, user-location device 102 can activate speaker 104 to emit an audible signal 114 only while both of these conditions are met, e.g., until user 106 is either too far away from speaker 104 or is not "in front of" the speaker to hear a quality audio signal, at which point, user-location device 102 deactivates the speaker 104. Similar to the example above, in an alternative case, user-location device 102 may be configured to only passively output user location data 112, which more "intelligent" speakers 104 may then use to determine when to activate and deactivate themselves, as appropriate.

The use of mmWave technology provides a number of unique benefits particularly suited for this application. For instance, mmWave radar is "non-intrusive," in that it does not capture visible image data (e.g., picture/video) that other user-location systems (e.g., cameras, LiDAR) might implement. Accordingly, user-location device 102 can securely be implemented in intimate environments, such as a bedroom or bathroom. Further, mmWave devices work in all lighting conditions (unlike image-based sensors), are less expensive and less complex than comparable LiDAR devices, and function well in both indoor and outdoor environments.

FIG. 2 is a block diagram showing some example components of a user-location device 202 for configuring audio parameters based on a location of a user. In general, user-location device 202 of FIG. 2 is an example implementation of user-location device 102 of FIG. 1, apart from any differences noted explicitly herein. User-location device 202 generally comprises at least one processor 204, memory 206, wireless-communication capabilities (illustrated in FIG. 2 as "Wi-Fi 208"), an ultra-wideband (UWB) anchor sensor 210, and an extremely high frequency (EHF) radar sensor 212. In some examples, but not all examples, user-location device 202 further includes a hardware-connection interface 214, an inertial-measurement unit (IMU) 216, and/or an integrated user interface 218.

Processor 204 can be any programmable device that accepts digital data as input, is configured to process the input according to instructions or algorithms, and provides results as outputs. In an embodiment, processor 204 can be a central processing unit (CPU) or a microcontroller or microprocessor configured to carry out the instructions of a computer program. Processor 204 is therefore configured to perform at least basic arithmetical, logical, and input/output operations.

Memory 206 can comprise volatile or non-volatile memory as required by the coupled processor 204 to not only provide space to execute the instructions or algorithms, but to provide the space to store the instructions themselves. As non-limiting examples, volatile memory can include random access memory (RAM), dynamic random-access memory (DRAM), or static random-access memory (SRAM), for example. In some examples, non-volatile memory can include read-only memory, flash memory, ferroelectric RAM, a hard disk, or optical-disc storage.

User-location device 202 can include other features, devices, and subsystems, such as an input/output engine or sound-processing engine, which include various engines or tools, each of which is constructed, programmed, configured, or otherwise adapted, to autonomously carry out a particular function or set of functions. The term "engine" as used herein is defined as a real-world device, component, or arrangement of components implemented using hardware, such as by an application-specific integrated circuit (ASIC) or field-programmable gate array (FPGA), for example, or as a combination of hardware and software, such as by a microprocessor system and a set of program instructions that adapt the engine to implement the particular functionality, which, during execution, transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, some or all of the functionality of processor 204 can be carried out in a variety of physically realizable configurations across engines and should not be limited to any particular implementation exemplified herein, unless such limitations are expressly called out.

User-location device 202 includes wireless-communication capabilities 208, configured to provide two-way data communication with a data network via a wireless connection. Additionally or alternatively, hardware-connection interface 214 can include a port (e.g., an Ethernet port) for providing two-way data communication with a network via a wired connection. Such configurations provide for the advantage that user-location device 202 can be configured as a "no setup" device, i.e., device 202 can automatically detect nearby audio devices 104 (FIG. 1) and communicate relevant parameter information 112 to the audio devices 104 without requiring an extensive manual setup and calibration process. The specific design and implementation of an input/output engine of processor 204 can depend on the communications network(s) over which user device 202 is intended to operate.

In the example shown in FIG. 2, processor 204, memory 206, and Wi-Fi 208 are illustrated as being coupled to, or integrated within, a common circuit board 220. In other words, circuit board 220 is illustrated as being physically distinct from, but communicatively coupled to, components 210-218. In other example implementations, such as the example illustrated in FIG. 3, circuit board 220 can include more, fewer, or different internal components 202 directly integrated.

In some examples, but not all examples, user-location device 202 includes a hardware-connection interface 214, e.g., including one or more ports for interconnecting with other devices and systems. Such ports may include, for instance, a power port for connecting to a power cable, an Ethernet port for connecting to a local data network, and/or a universal serial bus (e.g., USB-C) port as a connected data interface. In other examples, user-location device 202 may not have any or all of these connections, for instance, when user-location device 202 includes an integrated internal battery configured for wireless recharging.

In some examples, but not all examples, user-location device 202 includes an inertial-measurement unit (IMU) 216, such as an accelerometer, configured to produce orientation data about user-location device 202. In such examples, processor 204 is configured to use the orientation data to help determine the orientation of an audio-output device 104 (FIG. 1) and/or a user 106 relative to itself when generating relative location data. Additionally or alternatively, orientation data from IMU 216 can be used while mounting user-location device 102, 202 in a desired location, e.g., informing user 106 via a smartphone app whether the device is mounted "level."

In some examples, but not all examples, user-location device includes an integrated user interface 218, such as one or more buttons (e.g., a power/reset button), switches, LEDs, or other indicators enabling user 106 (FIG. 1) to manipulate configurable settings of user-location device 202. In other examples, user-location device 202 may be configured to be manipulated partially or entirely via a smartphone application.

FIGS. 1 and 2 both illustrate examples in which the user-location device 102, 202 is a fully encapsulated or "standalone" device, e.g., is not integrated within an audio-output device (e.g., a speaker unit). Such implementations provide for a number of benefits and practical applications. For instance, an encapsulated user-location device enables a compact, mobile form factor, enabling the device to be conveniently mounted at an ideal position within a desired setting (e.g., a room) so as to maximize the "field of view" of the device for purposes of detecting and locating user(s) 106. In one non-limiting example, user-location device 102, 202 could be manufactured to have a form factor defined by a housing of about 80 mm (about 3.2 inches) by about 80 mm (about 3.2 inches) by about 20 mm (about 0.8 inches). For more complex environment configurations (e.g., an L-shaped room), two or more user-location devices can be conveniently mounted and mutually interfaced to help "see" around the corner.

As shown in FIG. 1, user 106 can use a mobile application running on a mobile computing device 116 (e.g., smartphone, laptop, tablet, etc.) to help guide user 106 to mount user-location device 102, 202 at an "ideal" location within a particular environment. For instance, mobile device 116 can be configured to display a graphical user interface (GUI) that helps user 106 identify a location within a room to increase or maximize the "visible" field of view (FOV) for user-location device 102. Additionally or alternatively, the GUI can display an output from an inertial-measurement unit (IMU) 216 (FIG. 2) to help the user mount device 102 according to a "level" orientation.

Segregating user-location device 102, 202 into a distinct unit additionally isolates costs of design and manufacturing away from existing speaker hardware infrastructure. In other words, rather than re-designing existing speaker hardware to incorporate user-location device 102, 202, the device is configured to have essentially universal compatibility with any modern speaker unit that has both an integrated UWB tag and wireless-data-communication capabilities. In certain implementations, user-location device 102, 202 could be configured to adapt to "legacy" audio devices lacking an integrated UWB tag, e.g., by interfacing with a UWB-enabled smartphone to determine fixed (e.g., wall-mounted) speaker locations.

However, it should be noted that other example implementations are also contemplated, i.e., in which hardware and functionality of user-location device 102, 202 is integrated within an audio-output device 104. In such examples, the audio-output device 104 is considered to be co-located with user-location device 102, 202, thereby providing at least two advantages. First, user-location device 102, 202 would not necessarily require an integrated UWB anchor sensor 210, thereby conserving resources of production. Second, computation resources of processor 204 may be reduced when determining only a single location relative to a user 106, rather than triangulating multiple relative locations between a user-location device, a speaker, and the user.

Figure 3:
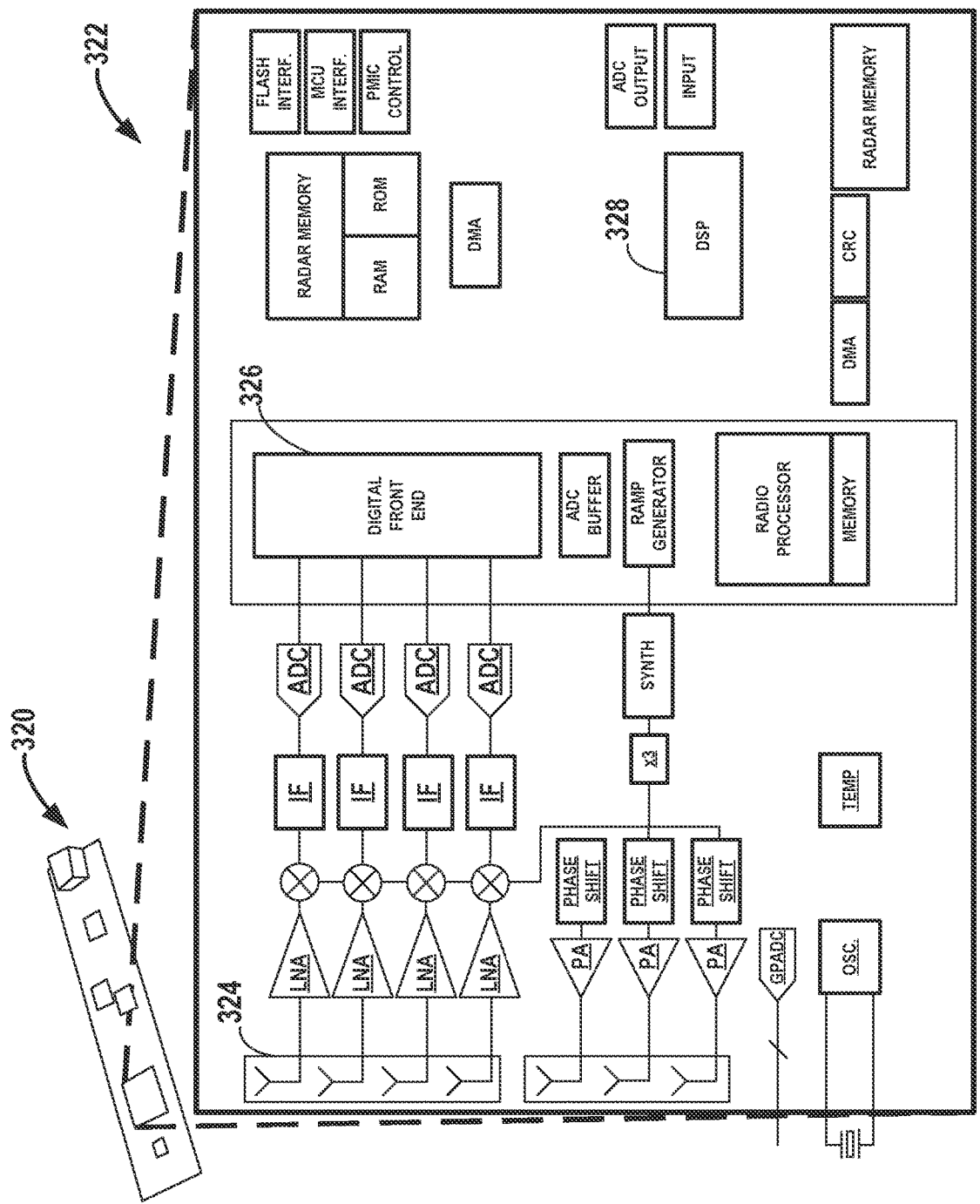
FIG. 3 is a circuit diagram illustrating an example architecture for the user-location device of FIG. 2.

FIG. 3 is a circuit diagram illustrating an example architecture of a circuit board 320 configured to perform the functionality ascribed to user-location devices 102, 202 of FIGS. 1 and 2, respectively, as described above. In general, circuit board 320 of FIG. 3 is an example implementation of circuit board 220 of FIG. 2, apart from any differences noted explicitly herein. For instance, as referenced above, as compared to circuit board 220 of FIG. 2, circuit board 320 of FIG. 3 includes a UWB radio chip 322 having a radio-frequency (RF) antenna array 324, an RF frontend 326, and digital signal processor (DSP) 328. For UWB anchor 210 (FIG. 2), chip 322 includes multiple transmission (Tx) and receiving (Rx) antennae 324 enabling determination of an angle of attack (AoA), e.g., the relative orientation of a particular signal. In some such examples, chip 322 is configured to define an RF azimuthal field-of-view (FoV) of about 140°, and an elevation FoV of about 140°. FIG. 3 also includes a low-noise amplifier (LNA), several intermediate frequency (IF) stages, power amplifiers (PA), phase shifters, an oscillator (OSC), a temperature (TEMP) module, an analog to digital converter (ADC), an ADC output, an input combiner (x3), synthesizer (SYNTH), direct memory access (DMA) module, cyclic redundancy check (CRC) module, read-only memory (ROM), microcontroller unit (MCU) interface (INTERF), and a flash memory interface (FLASH INTERF).

Figure 4A:
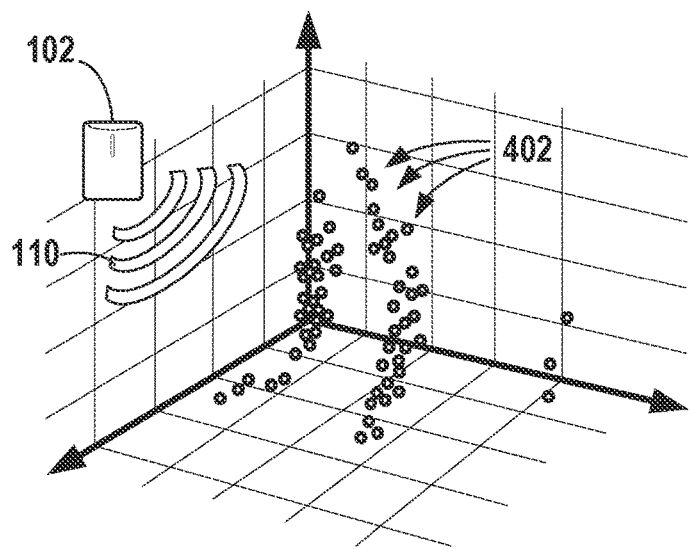
FIG. 4A is a conceptual diagram illustrating a technique for generating user-location datapoints based on extremely high frequency (EHF) radar sensor data.
Figure 4B:
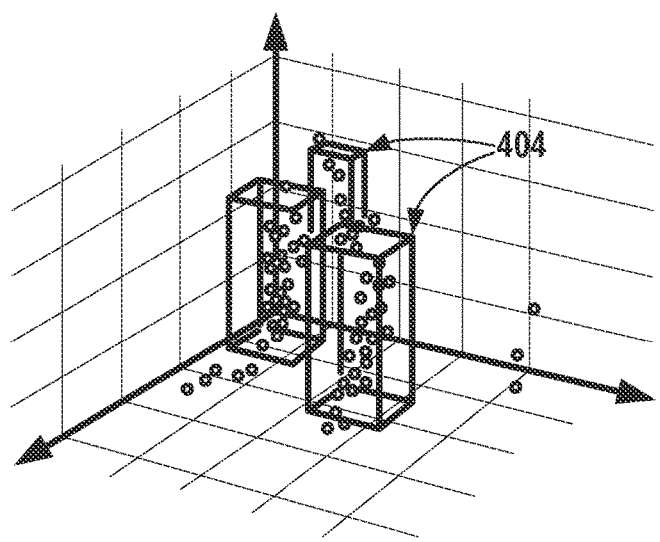
FIG. 4B is a conceptual diagram illustrating a technique for clustering a set of user-location datapoints.
Figure 4C:
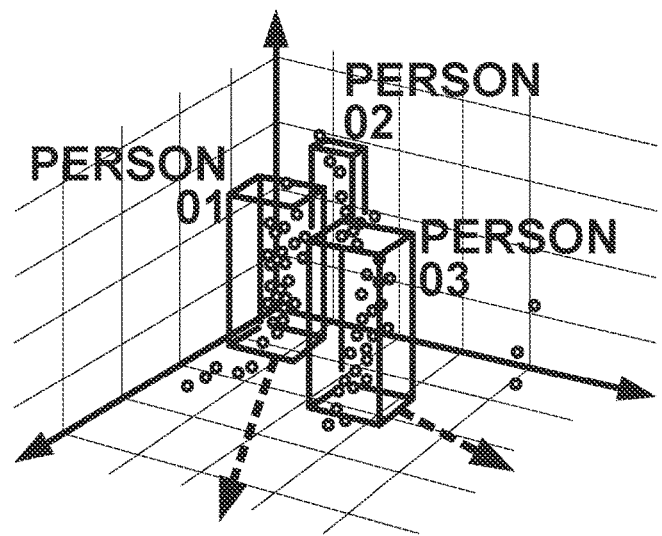
FIG. 4C is a conceptual diagram illustrating a technique for identifying and tracking users based on clustered user-location datapoints.

FIGS. 4A-4C are conceptual diagrams illustrating a technique for locating and tracking multiple people in a common environment based on extremely high frequency (EHF) radar sensor data (e.g., mmWave signals). As shown in FIG. 4A, user-location device 102 is configured to transmit EHF signal(s) 110 and detect the reflected signal(s). Based on the time-of-flight (ToF) of the signal 110, processor 204 can determine, with approximately ten-millimeter-level precision or better, the distance to the object that caused the signal 110 to reflect. Based on this calculation, processor 204 generates a plurality of datapoints 402. Although the EHF signals 110 may initially "map" the entire local environment (e.g., room) and all the objects within it, processor 204 can select for the subset of datapoints 402 that exhibit "human" characteristics, i.e., conform to patterns associated with a heartbeat of a person, a respiration of a person, or any other distinguishing biological and/or organic characteristics.

As illustrated in FIG. 4B, processor 204 can then input the datapoints 402 (e.g., the spatial coordinates X, Y, Z of datapoints 402) into a clustering algorithm configured to group datapoints 402 into locationally distinct (e.g., non-overlapping) clusters 404. In some examples, but not all examples, the clustering algorithm may be a sub-routine of an artificial-intelligence-based (AI) or machine-learning-based (ML) model trained to identify discrete structures 404 from seemingly random datapoints 402.

As illustrated in FIG. 4C, once user-location device 102 has located individual persons from data clusters 404, device 102 is able to track, in real-time, the relative locations of each person and then use this location data for purposes of configuring audio parameter(s) for any connected audio-output devices 104, as described above. For instance, user-location device 102 can transmit the location data to one or more directional speakers such that the speaker(s) may beam audio content directly toward the people in the local environment.

Figure 5:
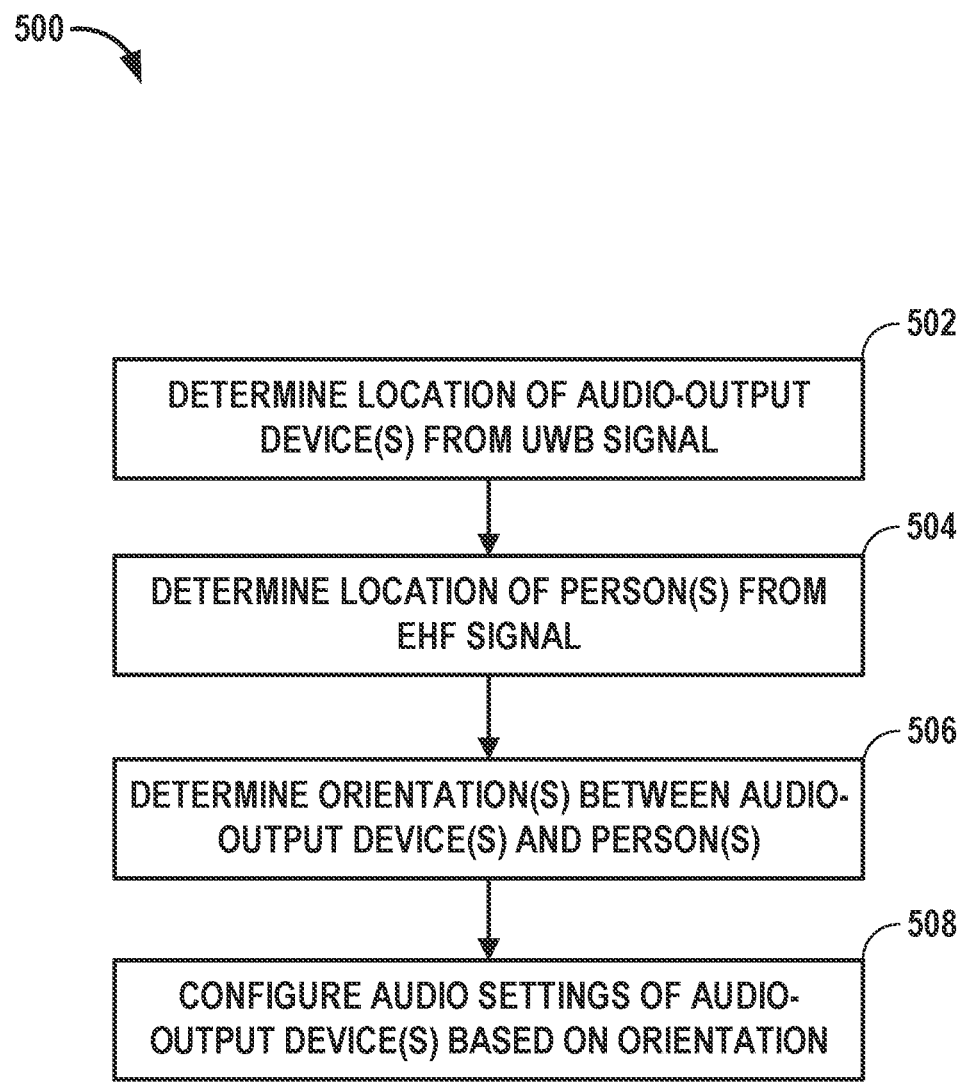
FIG. 5 is a flow diagram illustrating a technique for locating one or more person(s) within an environment, and configuring audio parameters based on the location(s).

FIG. 5 is a flowchart 500 illustrating a technique for configuring audio parameter(s) based on user-location data. The technique of FIG. 5 is described with respect to system 100 of FIG. 1, although any suitable system and/or device may be configured to perform the techniques described herein.

User-location device 102 is configured to receive ultra-wideband (UWB) signals 108 from one or more nearby audio-output devices 104 (e.g., speakers), and based on the UWB signals 108, determine an approximate location of the audio-output device(s) 104 relative to user-location device 102 (502).

User-location device 102 is further configured to cause an integrated Extremely High Frequency (EHF) radar unit 212 (FIG. 1) to emit a millimeter-wave (mmWave) signal and detect the reflected signal, and based on the reflected mmWave signal, determine a location of one or more person(s) 106 relative to user-location device 102 (504).

Based on these two determined relative locations, user-location device 102 is configured to determine a relative position and orientation between audio-output device(s) 104 and person(s) 106 (506). Based on the determined relative position and orientation, user-location device 102 configures (e.g., selects and applies) one or more audio parameters for audio-output device(s) 104 (508). Such parameters may include a direction of a beamed audio signal, an audio delay for an emitted audio signal, a loudness compensation or equalization of an audio signal, and/or an activation or deactivation of an emitted audio signal, as appropriate.

It should be understood that the individual operations used in the methods of the present teachings may be performed in any order and/or simultaneously, as long as the teaching remains operable. Furthermore, it should be understood that the apparatus and methods of the present teachings can include any number, or all, of the described examples, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A location device configured to:
   receive, from an audio-output device, an ultra-wideband (UWB) signal;
   determine, based on the UWB signal, a first relative location of the audio-output device;
   determine, based on a detected millimeter-wave (MMW) signal, a second relative location of one or more persons;
   determine, based on the first relative location and the second relative location, a relative orientation between the audio-output device and the one or more persons; and
   transmit, to the audio-output device, an indication of the relative orientation.

2. The location device of claim 1, wherein, to determine the second relative location of the one or more persons, the location device is configured to identify, based on the MMW signal, a pattern indicative of a heartbeat or a respiration of the one or more persons.

3. The location device of claim 1, wherein the one or more persons comprises at least two people, and wherein the location device is further configured to determine, based on the MMW signal, a respective relative location for each of the at least two people.

4. The location device of claim 3, wherein, to determine the respective relative location for each of the at least two people, the location device is further configured to:
generate, based on the MMW signal, a plurality of people-location datapoints;
execute, on the plurality of people-location datapoints, a clustering algorithm to generate the respective relative location for each of the at least two people.

5. The location device of claim 4, wherein, to perform the clustering algorithm, the location device is configured to apply a machine-learning-based model trained to cluster the people-location datapoints.

6. A system comprising a location device and an audio-output device,
wherein the location device is configured to:
receive, from the audio-output device, an ultra-wideband (UWB) signal;
determine, based on the UWB signal, a first relative location of the audio-output device;
determine, based on a detected millimeter-wave (MMW) signal, a second relative location of one or more persons;
determine, based on the first relative location and the second relative location, a relative orientation between the audio-output device and the one or more persons; and
transmit, to the audio-output device, an indication of the relative orientation.

7. The system of claim 6, wherein the audio-output device comprises a directional speaker, and wherein the directional speaker is configured to:
receive, from the location device, the indication of the relative orientation; and
based on the relative orientation, beam an audible signal toward the one or more persons.

8. The system of claim 6, wherein the audio-output device is configured to:
receive, from the location device, the indication of the relative orientation; and
based on the relative orientation, configure an audio delay, a loudness compensation, or an equalization of an audible signal output by the audio-output device.

9. The system of claim 6, wherein:
the indication of the relative orientation indicates that the one or more persons are within a field-of-view (FOV) of the audio-output device and are within a threshold distance from the audio-output device; and
based on the indication of the relative orientation, the audio-output device is configured to activate an audible signal while the one or more persons are within the FOV of the audio-output device and while the one or more persons are within the threshold distance from the audio-output device.

10. The system of claim 6, wherein:
the indication of the relative orientation indicates that the one or more persons are not within a field-of-view (FOV) of the audio-output device or are not within a threshold distance from the audio-output device; and
based on the indication of the relative orientation, the audio-output device is configured to deactivate an audible signal while the one or more persons are not within the FOV of the audio-output device or while the one or more persons are not within the threshold distance from the audio-output device.

11. The system of claim 6, wherein, to determine the second relative location of the one or more persons, the location device is configured to identify, based on the MMW signal, a pattern indicative of a heartbeat or a respiration of the one or more persons.

12. The system of claim 6, wherein the one or more persons comprises at least two people, and wherein the location device is further configured to determine, based on the MMW signal, a respective relative location for each of the at least two people.

13. The system of claim 12, wherein, to determine the respective relative location for each of the at least two people, the location device is further configured to:
generate, based on the MMW signal, a plurality of people-location datapoints; and
execute, on the plurality of people-location datapoints, a clustering algorithm to generate the respective relative location for each of the at least two people.

14. The system of claim 13, wherein, to execute the clustering algorithm, the location device is configured to apply a machine-learning-based model trained to cluster the people-location datapoints.

15. A method comprising:
receiving, by processing circuitry from an audio-output device, an ultra-wideband (UWB) signal;
determining, by the processing circuitry based on the UWB signal, a first relative location of the audio-output device;
determining, by the processing circuitry based on a detected millimeter-wave (MMW) signal, a second relative location of one or more persons;
determining, by the processing circuitry based on the first relative location and the second relative location, a relative orientation between the audio-output device and the one or more persons; and
transmitting, by the processing circuitry to the audio-output device, an indication of the relative orientation.

16. The method of claim 15, wherein, determining the second relative location of the one or more persons comprises identifying, based on the MMW signal, a pattern indicative of a heartbeat or a respiration of the one or more persons.

17. The method of claim 15, wherein the one or more persons comprises at least two people, and wherein the method further comprises determining, by the processing circuitry based on the MMW signal, a respective relative location for each of the at least two people.

18. The method of claim 17, wherein determining the respective relative location for each of the at least two people comprises:
generating, based on the MMW signal, a plurality of people-location datapoints; and
executing, on the plurality of people-location datapoints, a clustering algorithm to generate the respective relative location for each of the at least two people.

19. The method of claim 18, wherein executing the clustering algorithm comprises applying a machine-learning-based model trained to cluster the people-location datapoints.

20. The method of claim 15, further comprising causing, by the processing circuitry based on the relative orientation, the audio-output device to output an audible signal toward the one or more persons.

* * * * *